C. SCOTT.
PROTECTOR FOR VEHICLE TIRES.
APPLICATION FILED MAY 10, 1911.

1,003,815.

Patented Sept. 19, 1911.

UNITED STATES PATENT OFFICE.

CHARLES SCOTT, OF BAKER, OREGON.

PROTECTOR FOR VEHICLE-TIRES.

1,003,815.  Specification of Letters Patent.  Patented Sept. 19, 1911.

Application filed May 10, 1911. Serial No. 626,324.

*To all whom it may concern:*

Be it known that I, CHARLES SCOTT, a citizen of the United States, residing at Baker city, in the county of Baker and State of Oregon, have invented new and useful Improvements in Protectors for Vehicle-Tires, of which the following is a specification.

This invention relates to certain new and useful improvements in protectors for vehicle tires, and pertains more particularly to the protection of cushion and pneumatic tires employed on automobiles and similar vehicles.

The invention has for its object the provision of simple and improved means for covering the tire whereby the latter is protected from wear and injury; a more perfect traction is secured than is ordinarily possible; and the tendency of the wheels to skid on wet or slippery pavements or roadways is reduced to a minimum.

The invention will be hereinafter fully set forth and particularly pointed out in the claims.

Figure 1:
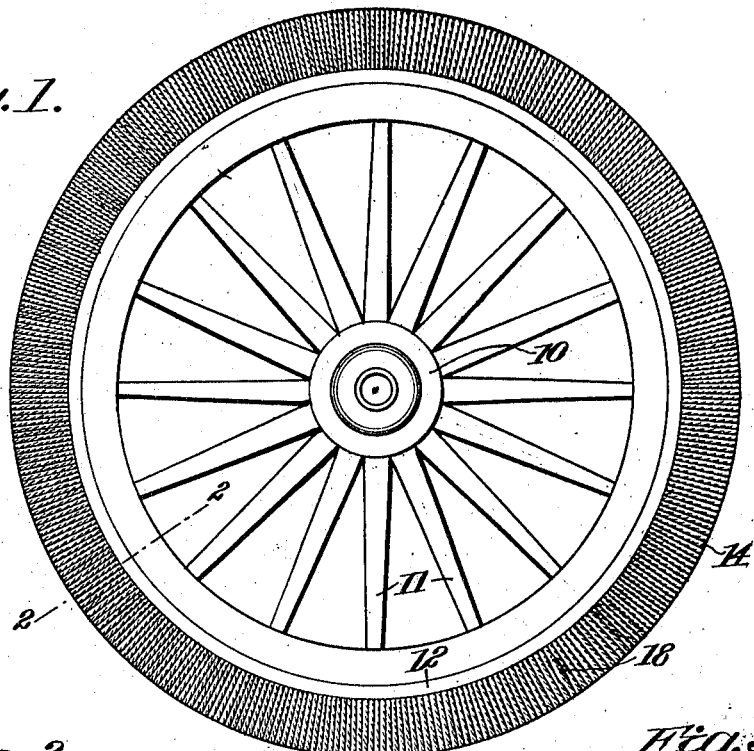
Figure 2:
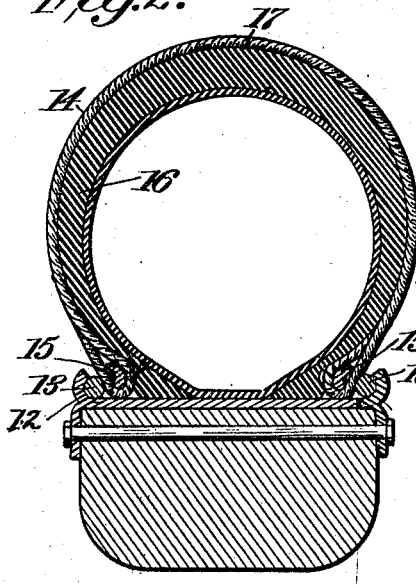
Figure 3:
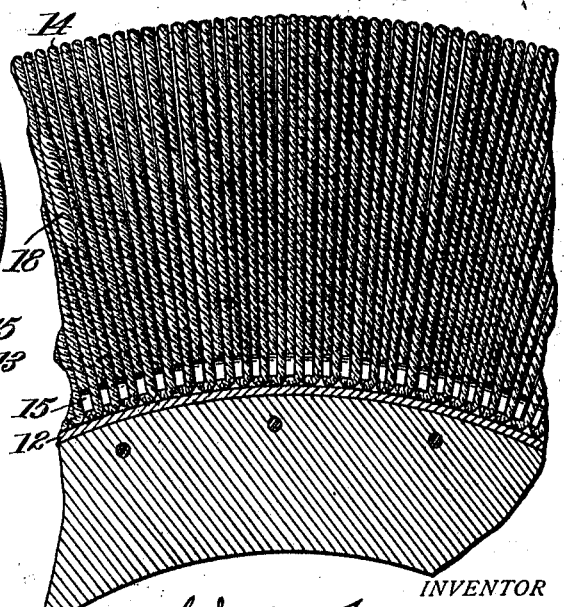

In the accompanying drawings:—Figure 1 is a side view illustrating a tire with my invention applied thereto. Fig. 2 is a cross sectional view of the tire on line 2—2 Fig. 1. Fig. 3 is an enlarged detail illustrating my invention, the tire securing clamp being removed.

Referring to the drawing, 10 designates a wheel of any suitable or preferred construction provided with the usual spokes 11 and rim 12. The rim is provided with tire securing rings or clamps 13 of any suitable or preferred construction.

My improved tire protector comprises a single continuous metal cable 14 passed around rings 15 disposed on each side of the tire 16, the strands of said cable passing over the tread of the tire and fitting closely over the same as indicated at 17, the ends of the cable being spliced or united in any suitable manner as indicated at 18. It will be noted that the rings 15 are provided with outwardly flaring edges 19 conforming to the contour of the tire. The securing rings or clamps 13 fit closely against the adjacent strands of the cable, firmly impinging the latter against the rings 15, said rings and said clamps serving to prevent slipping of the cable at these points. It will be noted that the cable is passed across the tread of the tire, completely incasing the latter, the strands passing between the tire and the rings 15, passing under the latter and between the same and the wheel ring, after which they are returned across the tire to the ring on the other side. In effect the cable 14 is woven between the rings 15 the tire 16 and the clamps 13, the strand that passes on the outside of the ring 15 on one side passing between the ring and the tire on the other side. The arrangement is such that the cable strands fit closely to each other adjacent the rings 15 and extend across the tread of the tire in a somewhat diagonal direction, the strands barely touching at the tread, but being sufficiently close to take up all the wear and to thoroughly protect the tire. The diagonal arrangement of the strands also tend to prevent skidding.

Having thus explained the nature of my invention, and described an operative manner of constructing and using the same, although without attempting to set forth all of the forms in which it may be made, or all of the forms of its use, what I claim is.

1. In a tire protector the combination with a wheel and a tire therefor, of rings encircling the rim of the wheel adjacent each side thereof, an endless cable passing alternately around said rings and over the tread of the tire, clamping rings coöperating with the first mentioned rings, to prevent slipping of said cable, and means for preventing displacement of said clamping rings.

2. In a tire protector the combination with a wheel and a tire therefor, of rings encircling the rim of said wheel adjacent each side thereof, an endless cable passing alternately around said rings and over the tread of the tire, said rings having outwardly flaring edges conforming to the contour of said tire, and means for securing the tire and rings in position.

In testimony whereof I have hereunto set my hand in presence of two subscribing witnesses.

CHARLES SCOTT.

Witnesses:
 W. H. STRAYER,
 C. E. KETCHAM.

---

Copies of this patent may be obtained for five cents each, by addressing the "Commissioner of Patents, Washington, D. C."